(12) United States Patent
Indrunas, Sr. et al.

(10) Patent No.: US 12,725,502 B2
(45) Date of Patent: Sep. 1, 2026

(54) CHILD SEAT MONITORING SYSTEM FOR A VEHICLE AND ASSOCIATED METHODS

(71) Applicant: Rescue Rangers LLC, Chuluota, FL (US)

(72) Inventors: Thomas J. Indrunas, Sr., Chuluota, FL (US); Samuel R. Rivera, Orlando, FL (US)

(73) Assignee: Rescue Rangers LLC, Chuluota, FL (US)

( * ) Notice: Subject to any disclaimer, the term of this patent is extended or adjusted under 35 U.S.C. 154(b) by 197 days.

(21) Appl. No.: 18/896,597

(22) Filed: Sep. 25, 2024

(65) Prior Publication Data

US 2026/0087918 A1 Mar. 26, 2026

(51) Int. Cl.

| | |
|---|---|
| ***G08B 21/02*** | (2006.01) |
| ***B60N 2/00*** | (2006.01) |
| ***G08B 21/18*** | (2006.01) |

(52) U.S. Cl.

CPC ....... *G08B 21/0277* (2013.01); *B60N 2/0022* (2023.08); *B60N 2/0024* (2023.08); *G08B 21/0213* (2013.01); *G08B 21/182* (2013.01)

(58) Field of Classification Search

CPC .............. G08B 25/016; G08B 21/0277; G08B 21/0213; G08B 21/182; B60R 16/02; B60R 21/015; B60R 21/0153; B60R 25/102; B60R 25/1004; B60N 2/0022; B60N 2/0024

See application file for complete search history.

(56) References Cited

U.S. PATENT DOCUMENTS

| | | | | |
|---|---|---|---|---|
| 9,845,050 | B1 * | 12/2017 | Garza | G08B 21/0205 |
| 10,737,616 | B1 * | 8/2020 | Kreager | B60N 2/0022 |
| 10,906,505 | B2 * | 2/2021 | Haymond | A44B 11/2569 |
| 10,991,225 | B1 * | 4/2021 | Lyons | B60N 2/003 |
| 2011/0080288 | A1 * | 4/2011 | Younse | B60N 2/267 340/573.1 |
| 2011/0169308 | A1 * | 7/2011 | Carter | B60N 2/274 297/217.3 |

(Continued)

FOREIGN PATENT DOCUMENTS

WO WO-2017086916 A1 * 5/2017 ............. B60N 2/267

OTHER PUBLICATIONS

Cybex—Sensor Safe—Installation Manual and User Guide (Year: 2023).*

*Primary Examiner* — Dung Hong

(57) ABSTRACT

A child seat monitoring system includes an OBD dongle that the plugs into an OBD port within the vehicle, and a child safety clip carried by the child seat. The OBD dongle and the child safety clip include Bluetooth modules paired with one another. A parent mobile phone is carried by an occupant of the vehicle and includes a Bluetooth module paired with the Bluetooth modules in the OBD dongle and the child safety clip. The parent mobile phone periodically transmits status messages to a backend server. The backend server analyzes the received status messages based on alert generation rules, and generates an alert in response to a measured temperature value within the vehicle exceeding a threshold, and the parent mobile phone is no longer in proximity to the vehicle while a child is still secured in a child seat. Alerts are transmitted by the backend server to mobile phones identified in a contact list.

14 Claims, 4 Drawing Sheets

(56) References Cited

U.S. PATENT DOCUMENTS

2016/0075296 A1* 3/2016 Alderman .............. G08B 21/24
340/989
2016/0193960 A1* 7/2016 Barabas ................... B60Q 9/00
340/457
2017/0021800 A1* 1/2017 Seibert ................. B60N 2/0021
2017/0129399 A1* 5/2017 Appukutty ............. B60K 35/22
2017/0158186 A1* 6/2017 Soifer ................ B60H 1/00742
2018/0126950 A1* 5/2018 Alderman .................. B60J 1/17
2018/0322758 A1* 11/2018 Rubinstein ........... B60N 2/0035
2018/0354443 A1* 12/2018 Ebrahimi ........... G08B 21/0277
2019/0088104 A1* 3/2019 Crewe .................... G08B 21/22
2020/0058210 A1* 2/2020 Williams ............. B60N 2/0024
2021/0056827 A1* 2/2021 Klamt .................... A61B 5/024
2021/0086663 A1* 3/2021 Jackson ................. G08B 21/22
2021/0142644 A1* 5/2021 Balakrishnan ..... G08B 21/0492
2022/0161761 A1* 5/2022 Moeller ................ H04L 9/0643
2022/0227259 A1* 7/2022 Sajovic .................. B60N 2/002
2023/0001873 A1* 1/2023 Bellifemine ......... B60N 2/2812
2024/0001809 A1* 1/2024 Tecu .................... B60N 2/0025
2025/0124779 A1* 4/2025 Sbabo .................. G08B 21/182
2025/0126445 A1* 4/2025 Cosey .................... G08B 21/14

* cited by examiner

CHILD SEAT MONITORING SYSTEM FOR A VEHICLE AND ASSOCIATED METHODS

TECHNICAL FIELD

The present disclosure relates to vehicles, and, more particularly, to a child seat monitoring system for a vehicle with a child seat for carrying a child, and associated methods.

BACKGROUND

Leaving an unattended child in a vehicle can lead to heat stroke and death, even if only left for a few minutes. Child deaths from vehicle-related heat stroke occur with lower frequency than those that occur in traffic crashes, but the nature of these completely preventable deaths warrants special attention. A young child's inability to exit the vehicle on their own combined with a low tolerance for elevated temperatures requires that children never be left unattended in vehicles.

Hyperthermia is the term used to describe an elevated body temperature without a change in the body's temperature set-point. Elevated body temperature occurs when the body is unable to dissipate the heat it produces and absorbs in situations of prolonged exposure to high temperatures, such as being trapped in an enclosed vehicle parked outdoors.

The body's response to excessive heat is initially manifested by mild heat illnesses such as heat edema, heat rash, or heat cramps. Once the core body temperature exceeds 100° F., heat exhaustion sets in with flulike symptoms and decreased cardiac output. Further increase in the core temperature beyond 104° F. is classified as heat stroke, which is a life-threatening condition characterized by mental status changes and a lack of sweating.

Thermal regulation characteristics are different for children than they are for adults. Children are less able to dissipate heat when subjected to extreme conditions caused by rigorous activity or environmental conditions. Children have a higher ratio of surface area to body mass, which contributes to heat absorption in extreme environmental conditions. Their smaller blood volume limits their ability to transfer heat from the core to their periphery, which is where heat would be transferred to the environment. These factors make children highly susceptible to the development of heat stroke in hot environments such as what may be found in an enclosed parked vehicle.

There are various child reminder systems to help minimize the risk of children being left behind in vehicles. One approach is to use a force or pressure sensitive element to determine that a child is seated in or removed from the child seat. Another approach is to use a switch in a child seat clip, which is carried by the child seat. The switch determines closure of the child seat clip to indicate a child is seated in the child seat.

The primary purpose of the child reminder systems is to issue notifications for preventing a child from being left in a parked vehicle. Some child reminder systems have mobile phone integration capabilities where a Bluetooth connection is used to wirelessly link a component of the child reminder system and the mobile phone. This requires installation of a mobile application (app) to interface with the child reminder system. Evenflo, for example, provides a SensorSafe chest clip that is part of the harness used to secure the child in the child seat, wherein a mobile phone with an app is paired with the SensorSafe chest clip to receive notifications and alerts.

A disadvantage of current child reminder systems that operate using a Bluetooth connection is that the mobile phone can only receive notifications when the mobile phone is within range of the Bluetooth connection. If the mobile phone was to shut off during a vehicle trip as a result of a low battery, or the mobile phone moves beyond the range of the Bluetooth connection, the child reminder system would no longer provide notifications or alerts to the mobile phone. Consequently, further improvements in such child reminder systems are desired for preventing a child from being left in a parked vehicle.

SUMMARY

A child seat monitoring system is for a vehicle with a child seat for carrying a child. The child seat monitoring system includes an on-board diagnostics (OBD) dongle configured to plug into an OBD port within the vehicle. The OBD dongle includes a first Bluetooth module and a first thermistor configured to measure temperature within the vehicle. A child safety clip is to be carried by the child seat and has a device identification (ID) associated therewith. The child safety clip includes a second Bluetooth module paired with the first Bluetooth module, and a second thermistor configured to measure the temperature within the vehicle.

A parent mobile phone is to be carried by an occupant of the vehicle and includes a third Bluetooth module paired with the first and second Bluetooth modules. The parent mobile phone is to periodically receive measured temperature values from the first and second thermistors. The parent mobile phone includes a transceiver configured to periodically transmit status messages that include the received measured temperature values, the device ID and a location of the parent mobile phone.

A backend server includes a database, a processor and a transceiver, and is configured to periodically receive from the parent mobile phone the status messages. The database is configured to store device IDs, alert generation rules associated with each device ID, and a contact list associated with each device ID. The processor is coupled to the database and is configured to analyze the received status messages based on the alert generation rules, and generate an alert in response to at least one of the measured temperature values in the status messages exceeds a threshold, and the parent mobile phone is no longer in proximity to the child safety clip while the child remains in the child seat. The transceiver is coupled to the processor and is configured to transmit the alert to mobile phones identified in the contact list.

The parent mobile phone may be configured to execute a child seat safety app that directs the status messages to the backend server, with the alert generation rules and the contact list being provided to the backend server via the child seat safety app.

A first one of the status messages may include a start monitoring command in response to the child safety clip initially communicating with the parent mobile phone indicating that the child is in the child seat. A last one of the status messages may include a stop monitoring command in response to the child safety clip stopping communications with the parent mobile phone indicating that the child has been removed from the child seat.

The contact list may include phone numbers of the parent mobile device and at least one guardian mobile device, and wherein the backend server may be configured to transmit the alerts to each of the phone numbers in the contact list.

The alert may include a text message that includes a last known location provided by the parent mobile phone.

In response to the OBD dongle and the child safety clip being in proximity to each other but not in proximity to the parent mobile phone, the OBD dongle may be configured to transmit a Bluetooth beacon with the device ID of the child seat clip for reception by a nearby mobile phone in proximity to the vehicle. The nearby mobile phone may automatically relay the Bluetooth beacon with the device ID and a location of the nearby mobile phone to the backend server. The backend server may be configured to generate and transmit the alert in response to receiving the relayed Bluetooth beacon. The alert may include a text message that includes a last known location provided by the nearby mobile phone.

The parent mobile phone may communicate with the backend server via a cellular network, and the OBD dongle may include a wireless chipset configured to communicate with the backend server via a mesh network that is separate from the cellular network. The wireless chipset may periodically transmit secondary status messages that include the device ID of the child safety clip, temperature measured by the first thermistor, vehicle state information and vehicle location.

The OBD port may be coupled to a controller area network (CAN) bus within the vehicle, and wherein the backend server is configured to send vehicle commands to the OBD dongle to change the vehicle state. The vehicle state may include an on/off state of an air condition system within the vehicle, and wherein the vehicle commands may include turning on the air conditioning system.

The child safety clip may include first and second housing portions configured to be clipped together when the child is secured in the child seat and unclipped when the child has been removed from the child seat. The child safety clip may communicate with the OBD dongle and the parent mobile phone in response to the child safety clip being clipped together, and may stop communicating with the OBD dongle and the parent mobile phone in response to the child safety clip not being clipped together.

Another aspect is directed to a method for operating a child seat monitoring system for a vehicle with a child seat for carrying a child. The method includes plugging an on-board diagnostics (OBD) dongle into an OBD port within the vehicle. The OBD dongle includes a first Bluetooth module and a first thermistor configured to measure temperature within the vehicle. A child safety clip is secured to the child seat. The child safety clip has a device identification (ID) associated therewith, and includes a second Bluetooth module paired with the first Bluetooth module, and a second thermistor configured to measure the temperature within the vehicle.

A parent mobile phone to be carried by an occupant of the vehicle is operated. The parent mobile phone includes a third Bluetooth module paired with the first and second Bluetooth modules and is configured to periodically receive measured temperature values from the first and second thermistors. The parent mobile phone includes a transceiver configured to periodically transmit status messages that include the received measured temperature values, the device ID and a location of the parent mobile phone.

The method includes providing a backend server configured to periodically receive from the parent mobile phone the status messages. The backend server includes a database, a processor and a transceiver.

The database stores device IDs, alert generation rules associated with each device ID, and a contact list associated with each device ID. The processor is operated to analyze the received status messages based on the alert generation rules, generate an alert in response to at least one of the measured temperature values in the status messages exceeds a threshold, and the parent mobile phone is no longer in proximity to the child safety clip while the child remains in the child seat. The transceiver is to transmit the alert to mobile phones identified in the contact list.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 1:
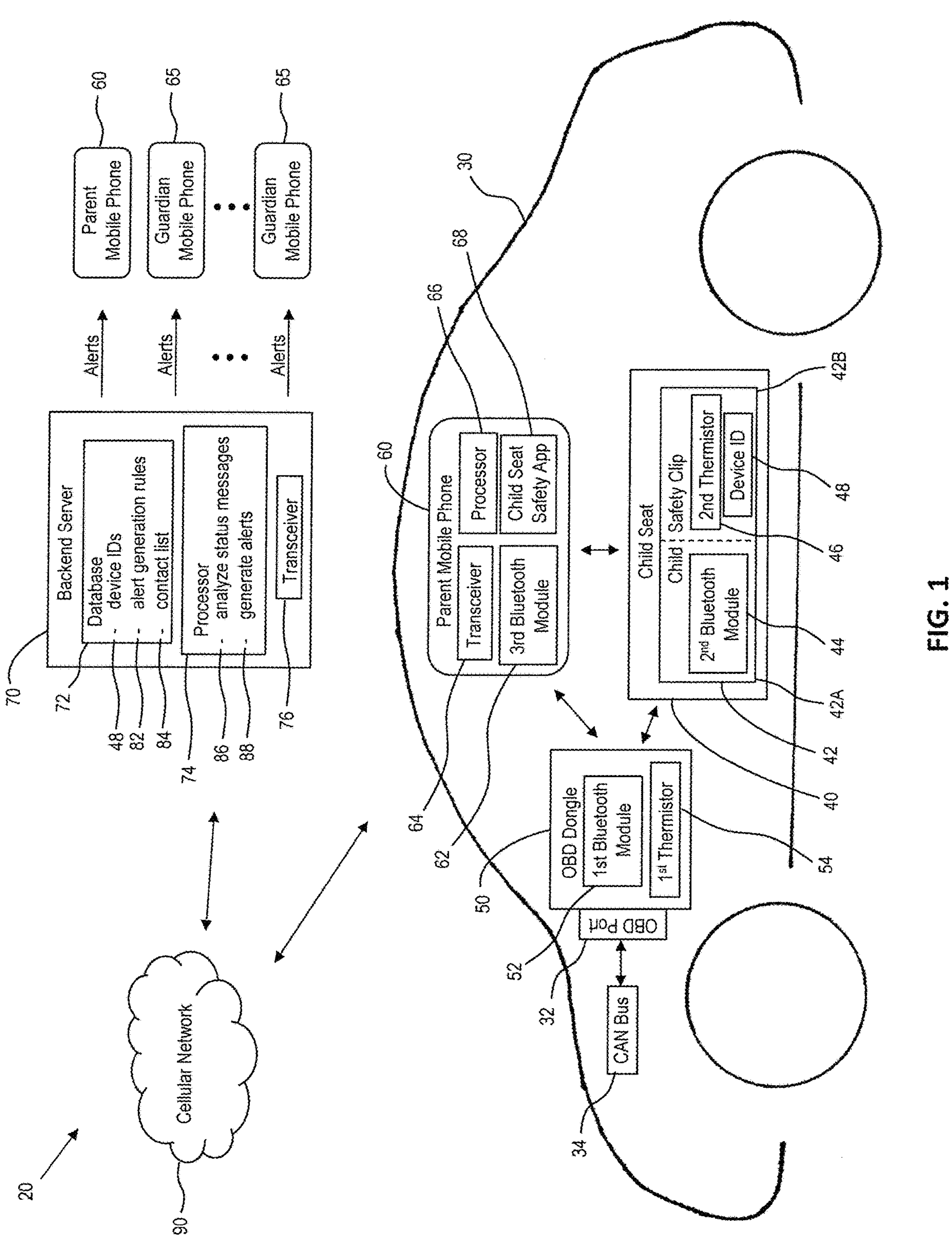
FIG. 1 is a schematic diagram of a child seat monitoring system for a vehicle in which various aspects of the disclosure may be implemented, wherein a parent mobile phone is in proximity to the vehicle.
Figure 2:
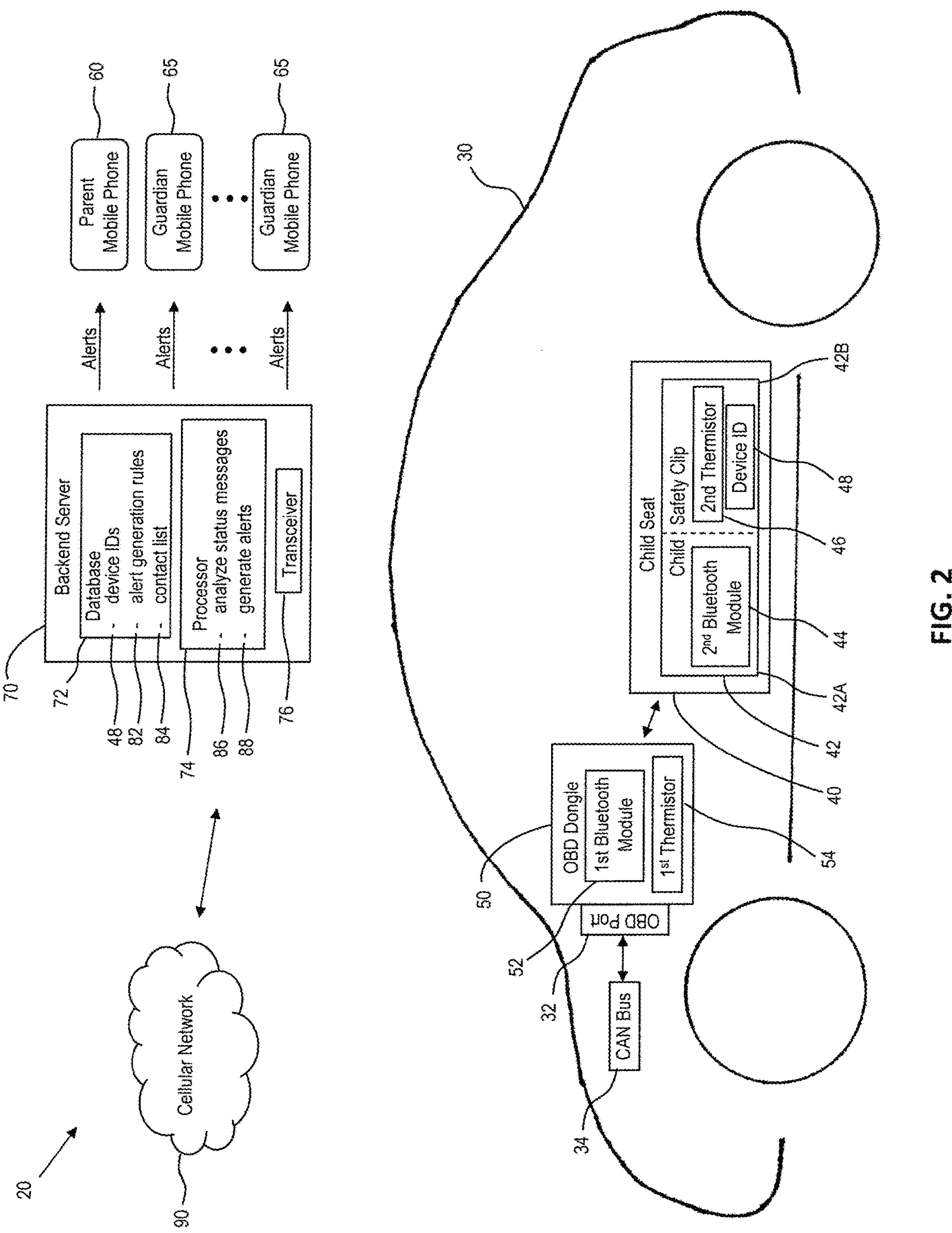
FIG. 2 is a schematic diagram of the child seat monitoring system as illustrated in FIG. 1, wherein the parent mobile phone is not in proximity to the vehicle.

Referring initially to FIGS. 1 and 2, a child seat monitoring system 20 for a vehicle 30 with a child seat 40 for carrying a child will be discussed. The child seat monitoring system 20 is configured to monitor temperatures within the vehicle 30, and to monitor if the child has been left unattended in the vehicle 30.

The monitoring is performed by a backend server 70 that is in communications with a mobile phone 60 carried by an occupant within the vehicle 30. The communications is based on the mobile phone 60 executing a child seat safety app 68. The child seat safety app 68 allows registration of the child safety clip 42 with the backend server 70, and provides a contact list 84 on who is to be contacted when an alert is generated by the backend server 70. Parents and guardians will be identified on the contact list 84. Since the occupant will typically be a parent of the child, the mobile phone 60 will be referred to as a parent mobile phone for discussion purposes.

In response to the temperatures within the vehicle 30 exceeding a threshold, an alert is generated by the backend server 70. The alert brings attention to the parent and to guardians of the child that the child needs immediate attention.

In one scenario, the vehicle 30 may have broken down on a hot day and the temperature in the vehicle exceeds the threshold which may result in the child overheating. This alert is generated even if the parent mobile phone is in proximity to the vehicle 30, as shown in FIG. 1. The alert is to be sent to the parent mobile phone 60 as well as to one or more guardian mobile phones 65 based on the contact list 84.

In addition, an alert is generated in response to the parent mobile phone 60 no longer being in proximity to the vehicle 30 while the child is still secured within the child seat 40, as shown in FIG. 2. In this scenario, the parent may have been distracted when exiting the vehicle 30 and forgets to remove the child from the vehicle. The alerts is to be sent to the parent mobile phone 60 as well as to one or more guardian mobile phones 65 based on the contact list 84.

The child seat monitoring system 20 includes an on-board diagnostics (OBD) dongle 50 configured to plug into an OBD port 32 within the vehicle 30. The OBD dongle 50 includes a first Bluetooth module 52 and a first thermistor 54 configured to measure temperature within the vehicle 30.

The OBD dongle 50 receives power from the vehicle, and interfaces with a controller area network (CAN) bus 34 that enables electronic control units (ECUs) within the vehicle 30 to communication with each other. This allows the OBD dongle 50 to collect vehicle state information. Vehicle state information may include, for example, speed of the vehicle 30 to indicate whether the vehicle is parked or moving, whether windows are up or down, and whether the air conditioning is on.

The child safety clip 42 is to be carried by the child seat 40 and has a device identification (ID) 48 associated therewith. The child safety clip 42 includes a second Bluetooth module 44 paired with the first Bluetooth module 52, and a second thermistor 46 configured to measure the temperature within the vehicle 30. The child safety clip 42 is powered by an internal battery.

The child safety clip 42 includes a first clip portion 42A and a second clip portion 42B. When the child is secured within the child seat 40, the first and second clip portions 42A, 42B are clipped together. This initiates Bluetooth communications between the OBD dongle 50 and the child safety clip 42. When the first and second clip portions 42A, 42B are not clipped together, this corresponds to the child no longer being within the child seat 40, and Bluetooth communications between the OBD dongle 50 and the child safety clip 42 is stopped.

The child seat 40 typically includes a seat belt with a pair of restraining straps. The seat belt may be configured as a latch and a latch plate that snaps into the latch when the child is secured within the child seat 40. In one embodiment, the child safety clip 42 may be inserted between the latch and the latch plate. In another embodiment, the child safety clip 42 may extend between the pair of restraining straps.

The parent mobile phone 60 is configured to execute a child seat safety app 68 that allows the parent to register the device ID 48 of the child safety clip 40 with the backend server 70. As part of the registration, the parent defines the alert generation rules 82 on when an alert is to be generated, as well as providing a contact list 84 with phone numbers of the parent and the guardians that are to receive the alerts. For example, the parent may define a temperature threshold that would cause an alert to be generated should the temperature within the vehicle 30 reach the temperature threshold. If the temperature threshold is not defined by the parent, then a default temperature threshold is entered. As another example, the parent may define a geofence boundary for the child. The geofence boundary may be characterized as a virtual fence, where if the child while in the vehicle travels beyond the geofence boundary, an alert is generated.

The parent mobile phone 60 includes a third Bluetooth module 62 paired with the first and second Bluetooth modules 44, 52 to receive measured temperature values from the first and second thermistors 54, 46. The OBD dongle 50 and the child safety clip 42 each provide respective temperature values for redundancy. In other embodiments, there may be one thermistor in either the OBD dongle 50 or in the child safety clip 42 to provide a single temperature value to the parent mobile phone 60.

The parent mobile phone 60 includes a transceiver 64 for periodically communicating status messages to the backend server 70 via a cellular network 90. The status messages may include the received measured temperature values from the OBD dongle 50 and the child safety clip 42, the device ID 48 of the child safety clip 42 and a location of the parent mobile phone 60.

The parent mobile phone 60 may include a global positioning system (GPS) chip for receiving signals from various global navigation satellite system (GNSS) satellites to calculate location. The vehicle location is appended to each transmitted status message. This occurs within cellular networks 90 regardless of the type of message being sent.

The backend server 70 includes a database 72, a processor 74 and a transceiver 76. The database 72 is configured to store device IDs 48 for a number of different child safety clips 42, alert generation rules 82 associated with each device ID, and contact lists 84 associated with each device ID.

The processor 74 is coupled to the database 72 and to the transceiver 76 and is configured to analyze the received status messages 86 based on the alert generation rules 82 associated with the device ID 48 of the child safety clip 42 in the vehicle 30.

The processor 74 generates alerts 88 in response to one of the measured temperature values in the status messages exceeding a temperature threshold, or in response to the parent mobile phone 60 no longer being in proximity to the child safety clip 42 due to the parent being distracted when exiting the vehicle 30 and forgetting to remove the child from the vehicle. The transceiver 76 is configured to transmit the alerts to the parent mobile phone 60 and the guardian mobile phones 65 identified on the contact list 84.

As noted above, the parent mobile phone 60 is configured to execute a child seat safety app 68 that directs the status messages to the backend server 70. The child seat safety app 68 is also used to provide the alert generation rules 82 and the contact list 84 to the backend server 70.

A first one of the status messages may include a start monitoring command in response to the child safety clip 42 being clipped together and initially communicating with the parent mobile phone 60. The start monitoring command indicates to the backend server 70 that the child is in the child seat 40. A last one of the status messages may include a stop monitoring command in response to the child safety clip 42 being unclipped and stopping communications with the parent mobile phone 60. This indicates to the backend server 70 that the child has been removed from the child seat 40.

The contact list 84 includes phone numbers of the parent mobile device 60 and one or more guardian mobile devices 65. The backend server 70 is configured to transmit via the transceiver 76 the alerts to each of the phone numbers in the contact list 84. The alerts may be provided as text messages that include a last known location provided by the parent mobile phone 60.

Figure 3:
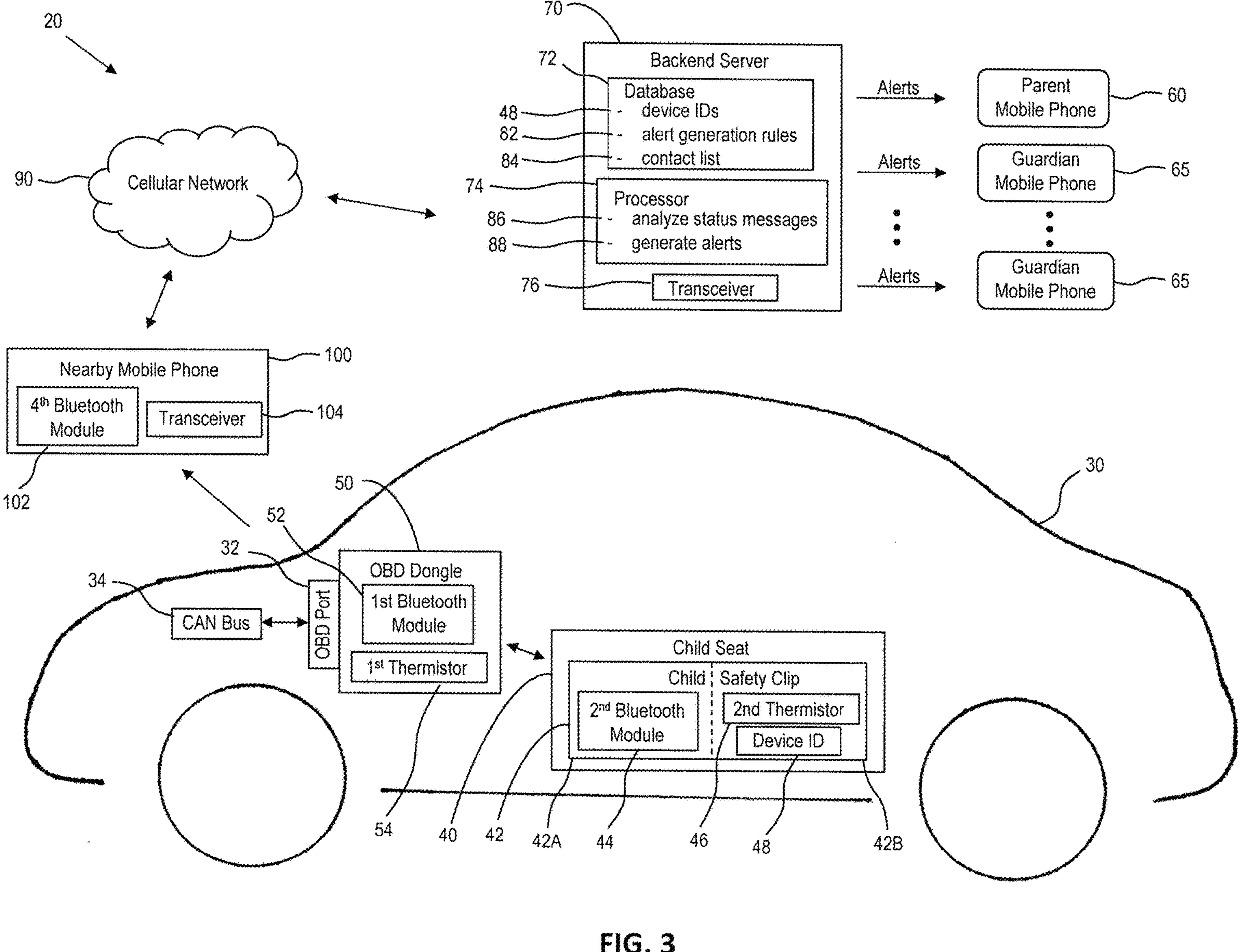
FIG. 3 is a schematic diagram of the child seat monitoring system as illustrated in FIG. 2, wherein a nearby mobile phone is in proximity to the vehicle.

Referring now to FIG. 3, the child seat monitoring system 20 is configured to utilize a nearby mobile phone 100 when the parent mobile phone 60 is no longer in proximity to the vehicle 30 so as to provide an indication that the child is still secured within the child seat 40. The nearby mobile phone 100 includes a fourth Bluetooth module 102 and a transceiver 104.

As long as the child remains secured with the child seat 40, the child seat clip 42 communicates with the OBD dongle 50 via Bluetooth. In response to the OBD dongle 50 and the child seat clip 42 communicating with one another but not with the patent mobile phone 60, the OBD dongle 50 is configured to transmit a Bluetooth beacon.

A Bluetooth beacon uses Bluetooth Low Energy (BLE) which is a version of the Bluetooth protocol. The Bluetooth beacon uses less power and sends less data. Since the OBD dongle 50 is powered by the vehicle 30, power consumption is not a factor when transmitting the Bluetooth beacon.

The Bluetooth beacon broadcasts the device ID 48 of the child safety clip 42 for reception by any nearby mobile phone 60 along with instructions for the device ID 48 to be relayed to the backend server 70. This allows the backend server 70 to associate the device ID 48 with the alert generation rules 82 for the child safety clip 42.

The transceiver 104 within the nearby mobile phone 100 relays the device ID 48 via the cellular network 90 to the backend server 70. Cellular networks 90 and internet service providers (ISPs) have allocated a limited amount of data, typically in the megabit range, that can be relayed in response to a mobile phone receiving a Bluetooth beacon. When the device ID 48 is relayed, a location of the nearby mobile phone 100 is also appended to each relayed message to the backend server 70. This occurs within cellular networks 90 regardless of the type of message being sent.

Generally, the vehicle 30 remains parked at the same location. However, there may be situations where the vehicle 30 is stolen with the baby onboard while the parent briefly goes inside a convenance store or gas station, for example. Now, the alerts generated by the backend server 70 will include locations of nearby mobile phones 65 that relay the device ID 48 to the backend server 70 as the vehicle travels. As one nearby mobile phone 65 is no longer in proximity to the vehicle 30, the process is repeated with another nearby mobile phone 100 that receives the Bluetooth beacon when in proximity to the vehicle 30.

Figure 4:
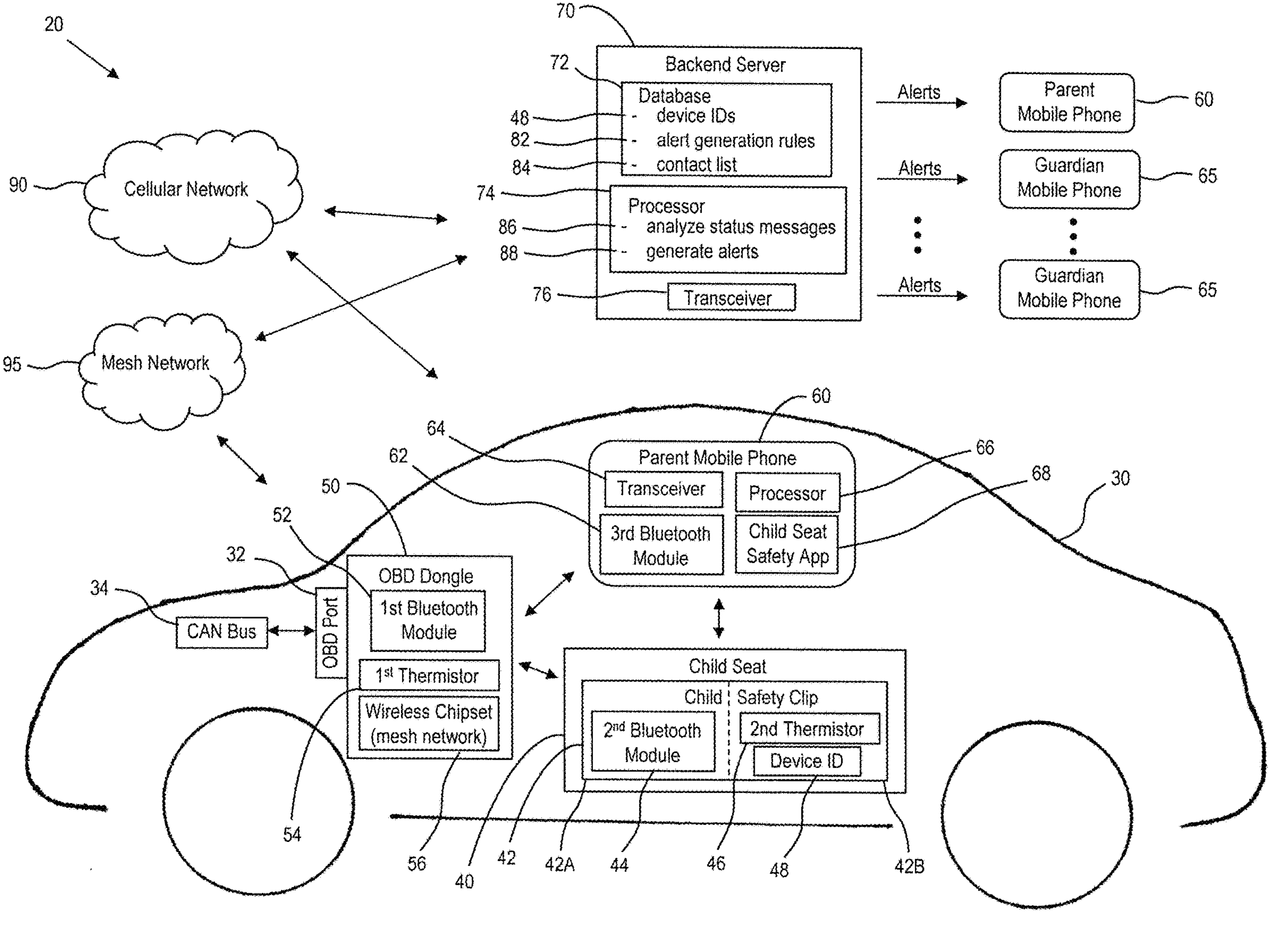
FIG. 4 is a schematic diagram of the child seat monitoring system as illustrated in FIG. 1, with inclusion of a mesh network.

Referring now to FIG. 4, the child seat monitoring system 20 is configured to utilize a mesh network 95 to periodically provide secondary status messages to the backend server 70. The mesh network 95 is separate from the cellular network 90. Operation within the mesh network 95 is based on the OBD dongle 50 having a wireless chipset 56.

The wireless chipset 56 can be used to connect with other wireless chipsets, forming a mesh network topology. Each wireless chipset 56 forms a node within the mesh network 95. Data can travel between the nodes via multiple routes, increasing reliability and range. The nodes are designed to rebroadcast messages they receive.

An example wireless chipset 56 supporting a mesh network is a LoRa chipset manufactured by Semtech. The mesh network is not limited to the LoRa chipset, as other wireless chipsets supporting mesh networks may be used.

Based on use of the LoRa chipset, the wireless chipset 56 transmits over license-free megahertz radio frequency bands, which is 5 MHz in North America. LoRa enables wireless data transmissions that can be made at ranges up to 3 miles in urban areas and up to 10 miles in rural areas, using low power.

The secondary status messages include the device ID 48 of the child safety clip 42, the temperature as determined by the first thermistor 54, and vehicle location. The wireless chipset 56 includes a GPS chip that determines location of the vehicle 30. This information provided in the secondary status messages via the mesh network 95 is a duplicate to the information provided by the parent mobile phone 60 via the cellular network 90. The backend server will take what information is considered to be the most accurate when analyzing the status messages and the secondary status messages.

An advantage of the wireless chipset 56 and the mesh network 95 is that a larger amount of customizable data can be exchanged. For example, vehicle state information may be provided to the backend server 70 from the wireless chipset 56. As noted above, the OBD dongle 50 interfaces with the CAN bus 34. This allows the OBD dongle 50 to collect vehicle state information. Vehicle state information may include, for example, speed of the vehicle 30 to indicate whether the vehicle is parked or moving, whether windows are up or down, and whether the air conditioning is on.

Based on the vehicle state information and the generated alert, the backend server 70 is configured to send vehicle commands to the OBD dongle 50. The vehicle commands may include, for example, rolling down the windows or turning on the air conditioning system.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A child seat monitoring system for a vehicle with a child seat for carrying a child, comprising:

an on-board diagnostics (OBD) dongle configured to plug into an OBD port within the vehicle, and comprising a first Bluetooth module and a first thermistor configured to measure temperature within the vehicle;

a child safety clip to be carried by the child seat and having a device identification (ID) associated therewith, and comprising a second Bluetooth module paired with the first Bluetooth module, and a second thermistor configured to measure the temperature within the vehicle;

a parent mobile phone to be carried by an occupant of the vehicle and comprising a third Bluetooth module paired with the first and second Bluetooth modules and configured to periodically receive measured temperature values from the first and second thermistors, and a transceiver configured to periodically transmit status messages that include the received measured temperature values, the device ID and a location of the parent mobile phone; and a backend server configured to periodically receive from the parent mobile phone the status messages, and comprising:

a database configured to store device IDs, alert generation rules associated with each device ID, and a contact list associated with each device ID, and a processor coupled to the database and configured to perform the following:

analyze the received status messages based on the alert generation rules, generate an alert in response to at least one of the following:

one of the measured temperature values in the status messages exceeds a threshold, and the parent mobile phone is no longer in proximity to the child safety clip in order to periodically receive the measured temperature values from the first and second thermistors while the child remains in the child seat, and a transceiver coupled to the processor and configured to transmit the alert to mobile phones identified in the contact list.

2. The child seat monitoring system according to claim 1 wherein the parent mobile phone is configured to execute a child seat safety app that directs the status messages to the backend server, with the alert generation rules and the contact list being provided to the backend server via the child seat safety app.

3. The child seat monitoring system according to claim 1 wherein a first one of the status messages includes a start monitoring command in response to the child safety clip initially communicating with the parent mobile phone indicating that the child is in the child seat.

4. The child seat monitoring system according to claim 1 wherein a last one of the status messages includes a stop monitoring command in response to the child safety clip stopping communications with the parent mobile phone indicating that the child has been removed from the child seat.

5. The child seat monitoring system according to claim 1 wherein the contact list includes phone numbers of the parent mobile device and at least one guardian mobile device, and wherein the backend server is configured to transmit the alerts to each of the phone numbers in the contact list.

6. The child seat monitoring system according to claim 5 wherein the alert comprises a text message that includes a last known location provided by the parent mobile phone.

7. The child seat monitoring system according to claim 1 wherein in response to the OBD dongle and the child safety clip being in proximity to each other but not in proximity to the parent mobile phone, the OBD dongle is configured to perform the following:

transmit a Bluetooth beacon with the device ID of the child seat clip for reception by a nearby mobile phone in proximity to the vehicle, wherein the nearby mobile phone automatically relays the Bluetooth beacon with the device ID and a location of the nearby mobile phone to the backend server.

8. The child seat monitoring system according to claim 7 wherein the backend server is configured to generate and transmit the alert in response to receiving the relayed Bluetooth beacon.

9. The child seat monitoring system according to claim 7 wherein the alert comprises a text message that includes a last known location provided by the nearby mobile phone.

10. The child seat monitoring system according to claim 1 wherein the parent mobile phone communicates with the backend server via a cellular network, and wherein the OBD dongle comprises a wireless chipset configured to communicate with the backend server via a mesh network that is separate from the cellular network, with the wireless chipset periodically transmitting secondary status messages that include the device ID of the child safety clip, temperature measured by the first thermistor, vehicle state information and vehicle location.

11. The child seat monitoring system according to claim 10 wherein the OBD port is coupled to a controller area network (CAN) bus within the vehicle, and wherein the backend server is configured to send vehicle commands to the OBD dongle to change the vehicle state.

12. The child seat monitoring system according to claim 11 wherein the vehicle state includes an on/off state of an air condition system within the vehicle, and wherein the vehicle commands include turning on the air conditioning system.

13. The child seat monitoring system according to claim 1 wherein the child safety clip comprises first and second housing portions configured to be clipped together when the child is secured in the child seat and unclipped when the child has been removed from the child seat, and wherein the child safety clip communicates with the OBD dongle and the parent mobile phone in response to the child safety clip being clipped together, and stops communicating with the OBD dongle and the parent mobile phone in response to the child safety clip not being clipped together.

14. A method for operating a child seat monitoring system for a vehicle with a child seat for carrying a child, comprising:

plugging an on-board diagnostics (OBD) dongle into an OBD port within the vehicle, the OBD dongle comprising a first Bluetooth module and a first thermistor configured to measure temperature within the vehicle;

securing a child safety clip to the child seat, the child safety clip having a device identification (ID) associated therewith, and comprising a second Bluetooth module paired with the first Bluetooth module, and a second thermistor configured to measure the temperature within the vehicle;

operating a parent mobile phone to be carried by an occupant of the vehicle, the parent mobile phone comprising a third Bluetooth module paired with the first and second Bluetooth modules and configured to periodically receive measured temperature values from the first and second thermistors, and a transceiver configured to periodically transmit status messages that include the received measured temperature values, the device ID and a location of the parent mobile phone; and providing a backend server configured to periodically receive from the parent mobile phone the status messages, the backend server comprising a database, a processor and a transceiver, and operating the backend server to perform the following steps:

storing in the database device IDs, alert generation rules associated with each device ID, and a contact list associated with each device ID, operating the processor to perform the following:

analyze the received status messages based on the alert generation rules, generate an alert in response to at least one of the following:

one of the measured temperature values in the status messages exceeds a threshold, and the parent mobile phone is no longer in proximity to the child safety clip in order to periodically receive the measured temperature values from the first and second thermistors while the child remains in the child seat, and operating the transceiver to transmit the alert to mobile phones identified in the contact list.

* * * * *